United States Patent
Boyce

(10) Patent No.: US 8,961,634 B2
(45) Date of Patent: Feb. 24, 2015

(54) FILTER SYSTEMS FOR AIR INTAKES OF AIRCRAFT ENGINES AND RELATED METHODS

(75) Inventor: Mark Edward Boyce, St. Charles, MO (US)

(73) Assignee: Aerospace Filtration Systems, Inc., Chesterfield, MO (US)

( * ) Notice: Subject to any disclaimer, the term of this patent is extended or adjusted under 35 U.S.C. 154(b) by 798 days.

(21) Appl. No.: 13/274,965

(22) Filed: Oct. 17, 2011

(65) Prior Publication Data

US 2013/0092798 A1   Apr. 18, 2013

(51) Int. Cl.
*B01D 50/00* (2006.01)
*F02C 7/052* (2006.01)
*B64D 33/02* (2006.01)
*F16K 31/06* (2006.01)
*B01D 46/10* (2006.01)
*B01D 46/12* (2006.01)
*B01D 46/00* (2006.01)
*B64C 27/04* (2006.01)

(52) U.S. Cl.
CPC ............... *F02C 7/052* (2013.01); *B64D 33/02* (2013.01); *F16K 31/06* (2013.01); *B01D 46/103* (2013.01); *B01D 46/12* (2013.01); *B01D 46/0087* (2013.01); *B64D 2033/0246* (2013.01); *F05D 2220/329* (2013.01); *B01D 2273/10* (2013.01); *B64C 27/04* (2013.01)
USPC .................... 55/306; 55/309; 55/312; 96/421; 415/121.2; 60/39.092

(58) Field of Classification Search
USPC .............. 55/306, 309, 312, 313, 314; 96/417, 96/421; 415/121.2; 60/39.092
See application file for complete search history.

(56) References Cited

U.S. PATENT DOCUMENTS

| | | | |
|---|---|---|---|
| 2,928,497 A * | 3/1960 | Stockdale | 55/306 |
| 3,411,272 A | 11/1968 | Carmon | |
| 3,421,296 A | 1/1969 | Beurer, Sr. | |
| 3,449,891 A | 6/1969 | Shohet et al. | |
| 3,483,676 A | 12/1969 | Sargisson | |
| 6,595,742 B2 | 7/2003 | Scimone | |
| 7,879,123 B2 | 2/2011 | Lundquist et al. | |
| 2002/0182062 A1 | 12/2002 | Scimone | |
| 2014/0077039 A1* | 3/2014 | Scimone | 244/23 B |

FOREIGN PATENT DOCUMENTS

GB    1201096 A    8/1970

OTHER PUBLICATIONS

PCT International Search Report and Written Opinion from the International Searching Authority regarding PCT/US2012/059460 filed in Oct. 10, 2012 mailed on Jun. 28, 2013, 10 pgs.
CH-47 Chinook Helicopter Centrisep® Engine Advanced Protection System (EAPS); Data Sheet AECH47SENa; 2011; 2 pages; Pall Corporation; http://www.pall.com/pdfs/Aerospace-Defense-marine/AECH47SEN.pdf.

* cited by examiner

*Primary Examiner* — Robert A Hopkins
(74) *Attorney, Agent, or Firm* — Armstrong Teasdale LLP

(57) ABSTRACT

A filter system includes a filter assembly having an interior, an end defining a bypass opening, and another end for coupling to an air intake of an aircraft engine to permit intake air from the interior to enter the air intake. The filter system includes a bypass closure movable relative to the filter assembly between at least a first position and a second position. The bypass closure substantially covers the bypass opening in the first position to inhibit intake air from entering the interior through the bypass opening. The filter system includes an actuator coupled to at least one of the filter assembly and the bypass member to cause relative movement of the bypass closure between the first and second positions.

19 Claims, 9 Drawing Sheets

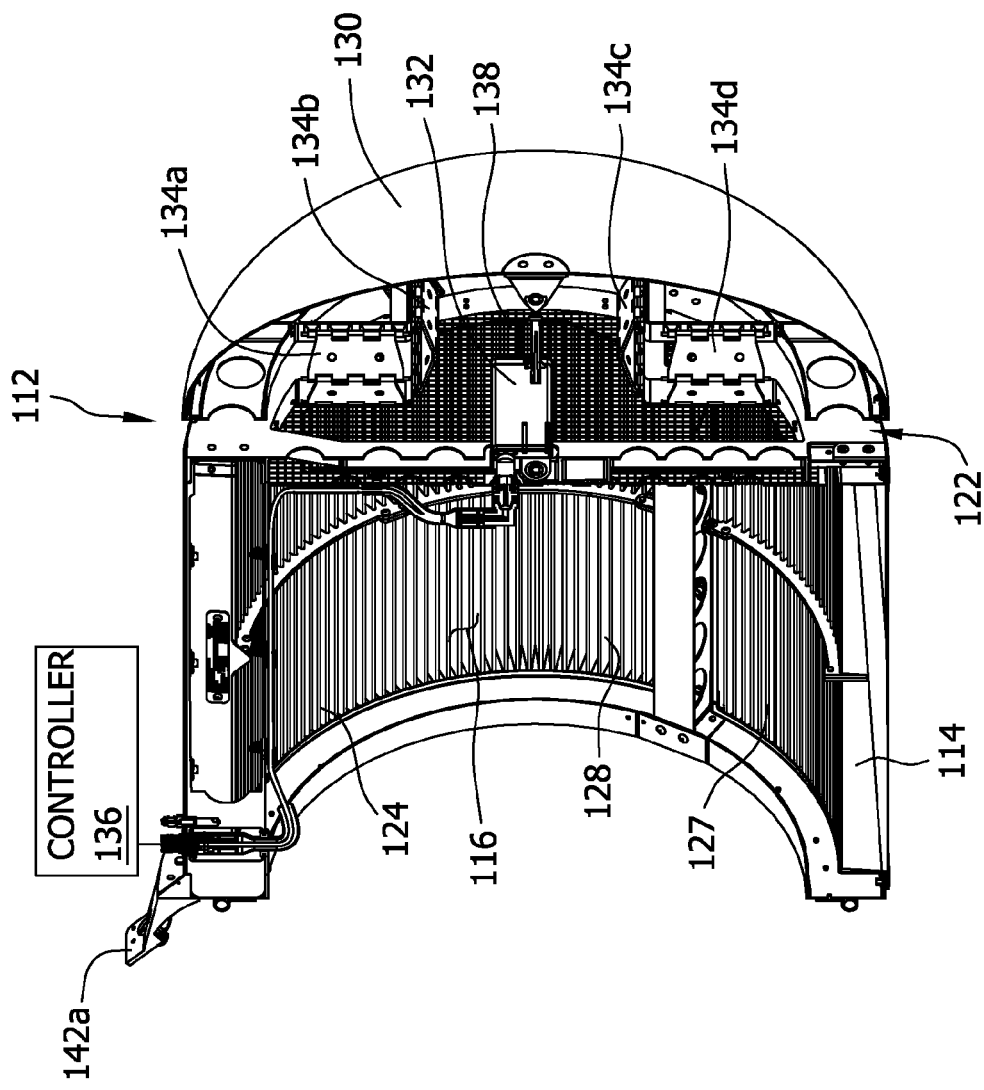

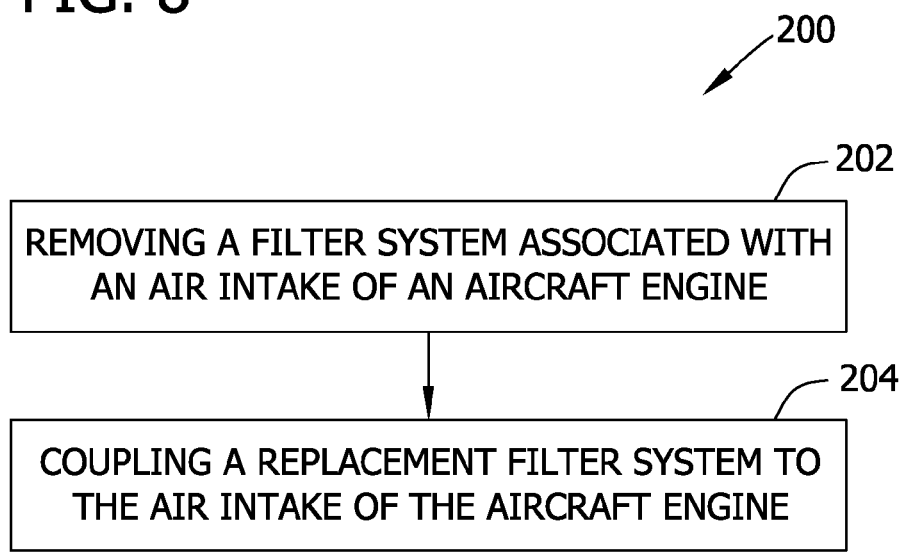

FILTER SYSTEMS FOR AIR INTAKES OF AIRCRAFT ENGINES AND RELATED METHODS

FIELD

The field of this disclosure relates generally to air filter systems for aircraft and related methods, and more particularly, to filter systems for aircraft engine air intakes and to related methods.

BACKGROUND

This section is intended to introduce various aspects of art that may be related to various aspects of the present disclosure, which are described and/or claimed below. This discussion should be helpful in providing background information to facilitate a better understanding of the various aspects of the present disclosure. These statements are to be read in this light, and not as admissions of prior art.

An engine for aircraft propulsion requires intake air that is free from contaminants to provide for efficient combustion and avoid damage to internal engine components. Some known compressors and turbines are designed with small clearances between moving parts that maximize efficiency, but which also increase vulnerability to damage of engine parts from small foreign particles. Contamination of intake air, even in a small amount, may cause premature wear on engine components, increases maintenance costs, and degrades operational performance and reliability. Aircraft are exposed to contaminants when operating at low altitudes where air is frequently contaminated with material from the ground, such as sand and dust. This problem may be aggravated for helicopters due to rotor downwash and prolonged low-altitude operation. Systems which remove foreign particles from intake flow have been developed to protect the engine from damage. For example, a filter may be positioned across the intake of the engine.

Filtered intake systems typically have a bypass door which provides an alternate entryway for air. During normal operations, the door remains closed and sealed to the alternate entryway to prevent contaminants from leaking into the filtered air stream. But if the contaminant separator becomes partially or fully restricted, the bypass door is opened to permit greater intake of air and safe operation of the engine.

SUMMARY

According to one aspect of the present disclosure, a filter system is disclosed. The filter system includes a filter assembly having an interior, a first end defining a bypass opening, and a second end for coupling to an air intake of an aircraft engine to permit intake air from the interior to enter the engine air intake. The filter assembly defines a substantially annular cross-section and includes at least one filter media for removing contaminants from intake air entering the interior through the filter media. The filter system includes a bypass closure movable relative to the filter assembly between at least a first position and a second position. The bypass closure substantially covers and substantially seals the bypass opening in the first position to inhibit intake air from entering the interior through the bypass opening, and the bypass closure is spaced apart from the filter assembly in the second position to permit intake air to enter the interior through the bypass opening. The filter system includes an actuator coupled to at least one of the filter assembly and the bypass member to cause relative movement of the bypass closure between the first and second positions.

According to another aspect of the present disclosure, an aircraft is disclosed. The aircraft includes a fuselage having a forward direction and an aircraft engine coupled to the fuselage. The aircraft engine includes at least one intake generally facing the forward direction for receiving intake air. The aircraft includes a filter system including a bypass closure and a filter assembly having an interior, a first end defining a bypass opening, and a second end coupled to the intake for permitting intake air flow from the interior of the filter assembly into the intake of the aircraft engine. The filter assembly defines a substantially annular cross-section. The bypass closure is movable between a first position and a second position. The bypass closure substantially covers and substantially seals the bypass opening in the first position to inhibit intake air from entering the interior through the bypass opening, and the bypass closure spaced apart from the filter assembly in the second position to permit intake air to enter the interior through the bypass opening.

According to yet another aspect of the present disclosure, a method of retrofitting a filter assembly for an intake of an aircraft is disclosed. The method includes removing a filter system associated with an air intake of an aircraft engine and coupling a replacement filter system to the air intake of the aircraft engine. The replacement filter system includes a bypass closure and a substantially cylindrical filter assembly having an interior and a first end defining a bypass opening. The bypass closure is movable between a first position and a second position. The bypass closure substantially covers and substantially seals the bypass opening in the first position to inhibit intake air from entering the interior through the bypass opening, and the bypass closure is spaced apart from the filter assembly in the second position to permit intake air to enter the interior through the bypass opening.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated embodiments may be incorporated into any of the above-described aspects, alone or in any combination.

BRIEF DESCRIPTION OF THE DRAWINGS

The drawings are not to scale and certain features may be exaggerated for ease of illustration.

FIG. 7 is an elevational view of the cross-section of filter assembly of FIG. 4, along line 6-6.

FIG. 8 is a block diagram of a method of retrofitting a filter system according to another exemplary embodiment.

DETAILED DESCRIPTION

Figure 1:
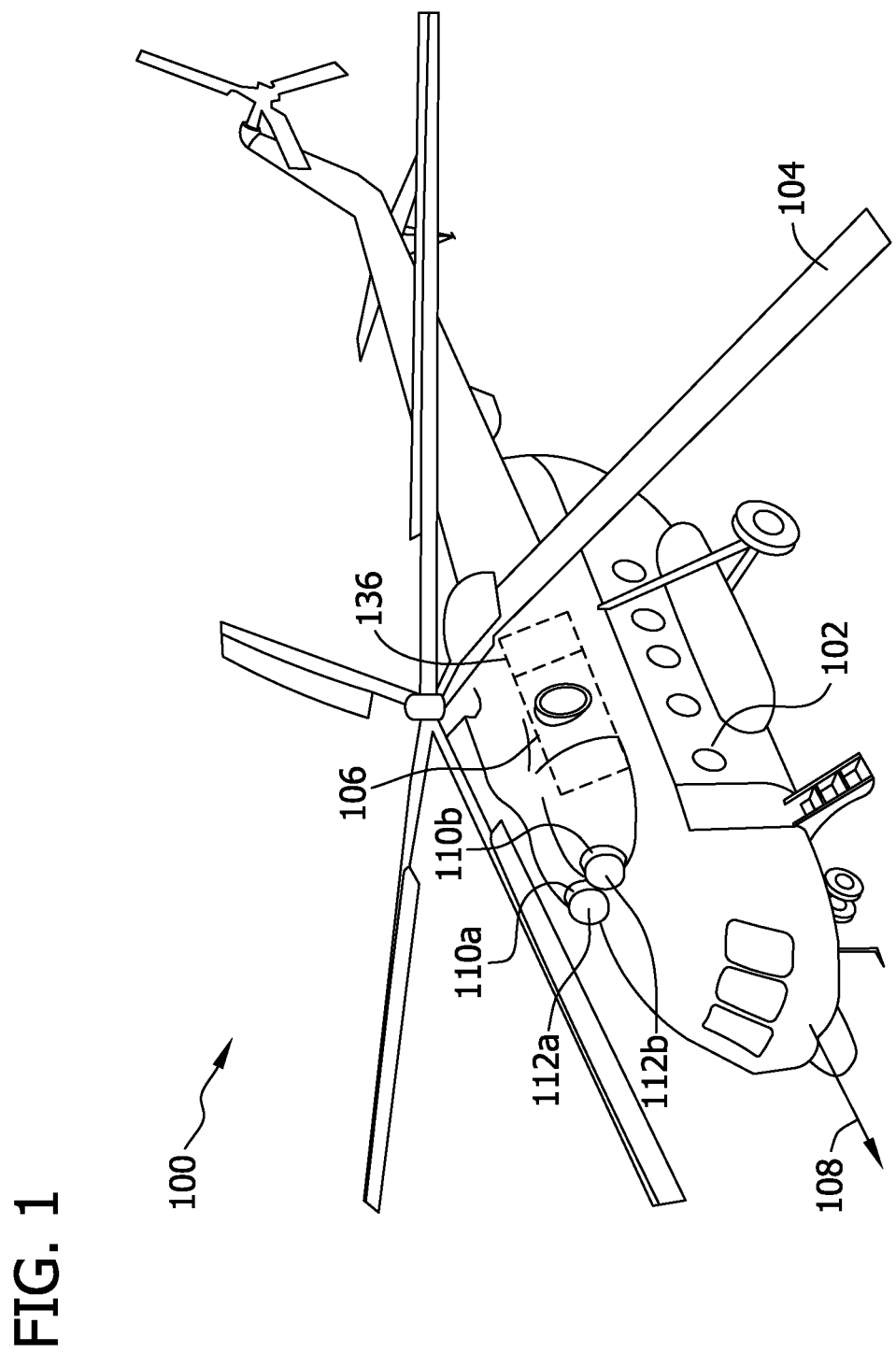
FIG. 1 is a perspective view of an aircraft according to one exemplary embodiment of the present disclosure.
Figure 2:
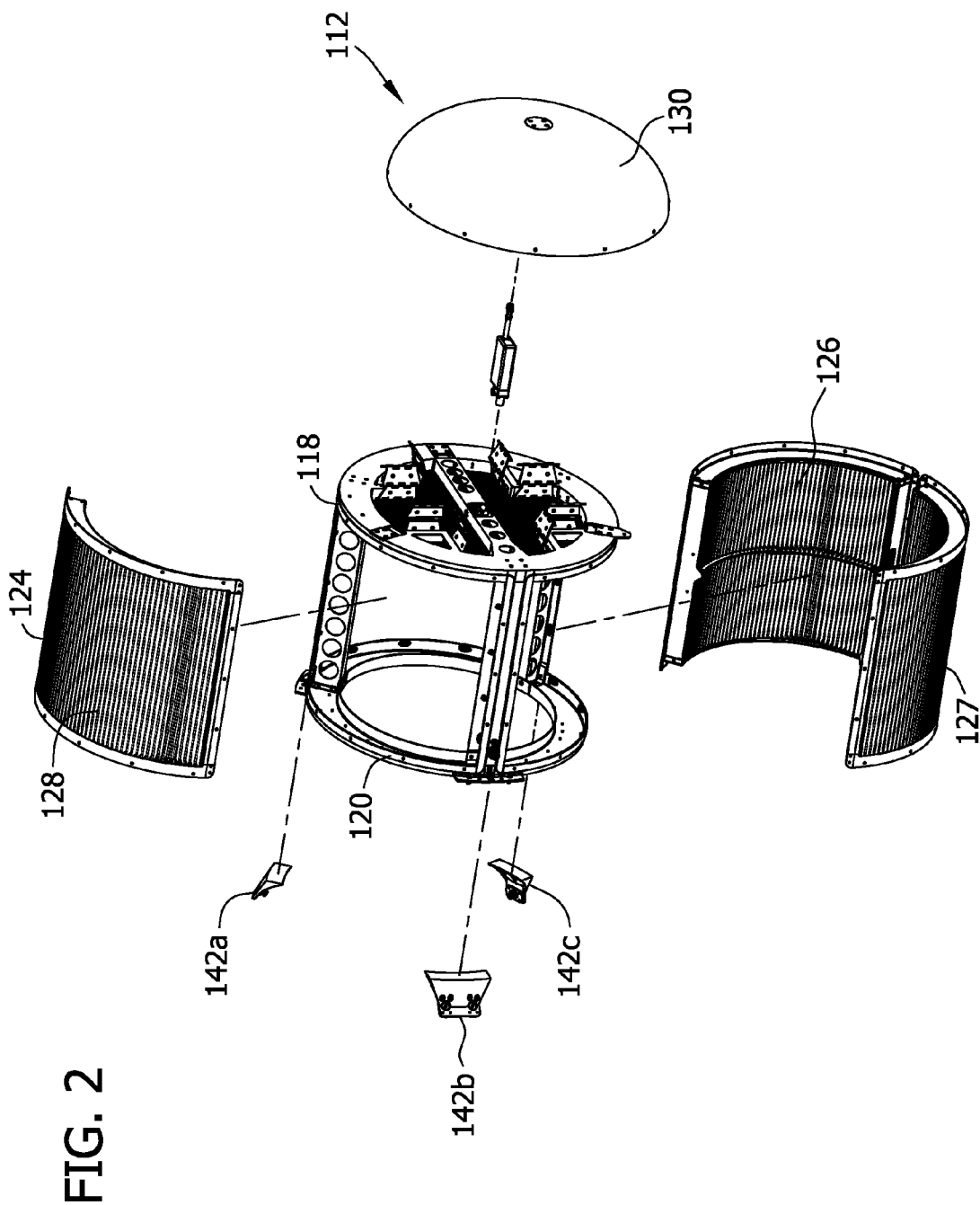
FIG. 2 is an exploded perspective view of an exemplary filter system.
Figure 3:
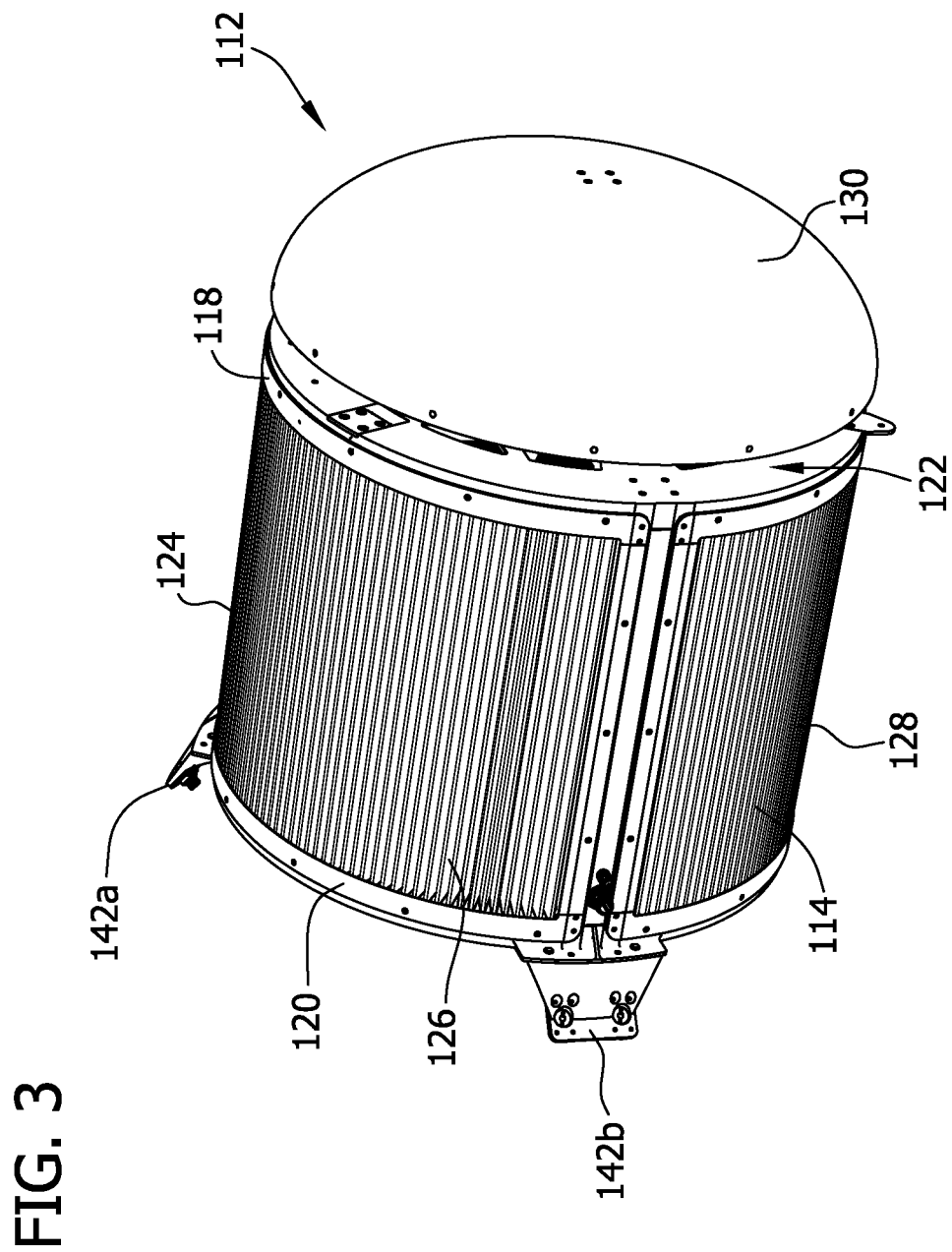
FIG. 3 is a front perspective view of the assembled filter system of FIG. 2.

FIG. 1 illustrates an embodiment of an aircraft 100, and in this embodiment, the aircraft is a helicopter. Helicopters designated S-61, SH3, BV-107, CH-46 AS 332, Super Puma, MI-17, KA-27, and/or KA-32, CH-47 are a few examples of helicopters usable with the systems and methods of the present disclosure.

Helicopter 100 generally includes a fuselage 102, rotor blades 104, and an aircraft engine 106, which may include a turbine engine, a piston engine, or another type of engine suitable for generating rotation of rotor blades 104, which provides thrust for the aircraft 100. The fuselage 102 defines a forward direction 108, as designated in FIG. 1. The aircraft engine 106 includes two intakes 110a and 110b for receiving air flow for use by aircraft engine 106 in a combustion process. It should be appreciated that other helicopter embodiments may include a different number of intakes for receiving intake air usable in a combustion process. In this embodiment, intake 110 generally faces the forward direction 108, such that forward movement of helicopter 100 causes intake air to flow into the intake 110.

Prior filter systems for helicopters include those shown in co-assigned U.S. Pat. Nos. 6,595,742; 6,824,582; 7,192,462; 7,491,253; and 7,575,014, all of which are incorporated herein by reference.

As illustrated in FIG. 1, helicopter 100 includes two filter systems 112a, 112b. It should be appreciated that other helicopter embodiments may include a different number of filter assemblies. Each of the filter systems 112a-b is coupled to a respective one of the intakes 110a-b. Intake air passes through the filter system 112 prior to entering the air intake 110 of aircraft engine 106. The filter system 112 is structured to filter intake air to remove containments therefrom, prior to permitting the intake air to enter the air intake 110 of the aircraft engine 106. An exemplary filter system 112 is illustrated in FIGS. 2-7.

Figure 4:
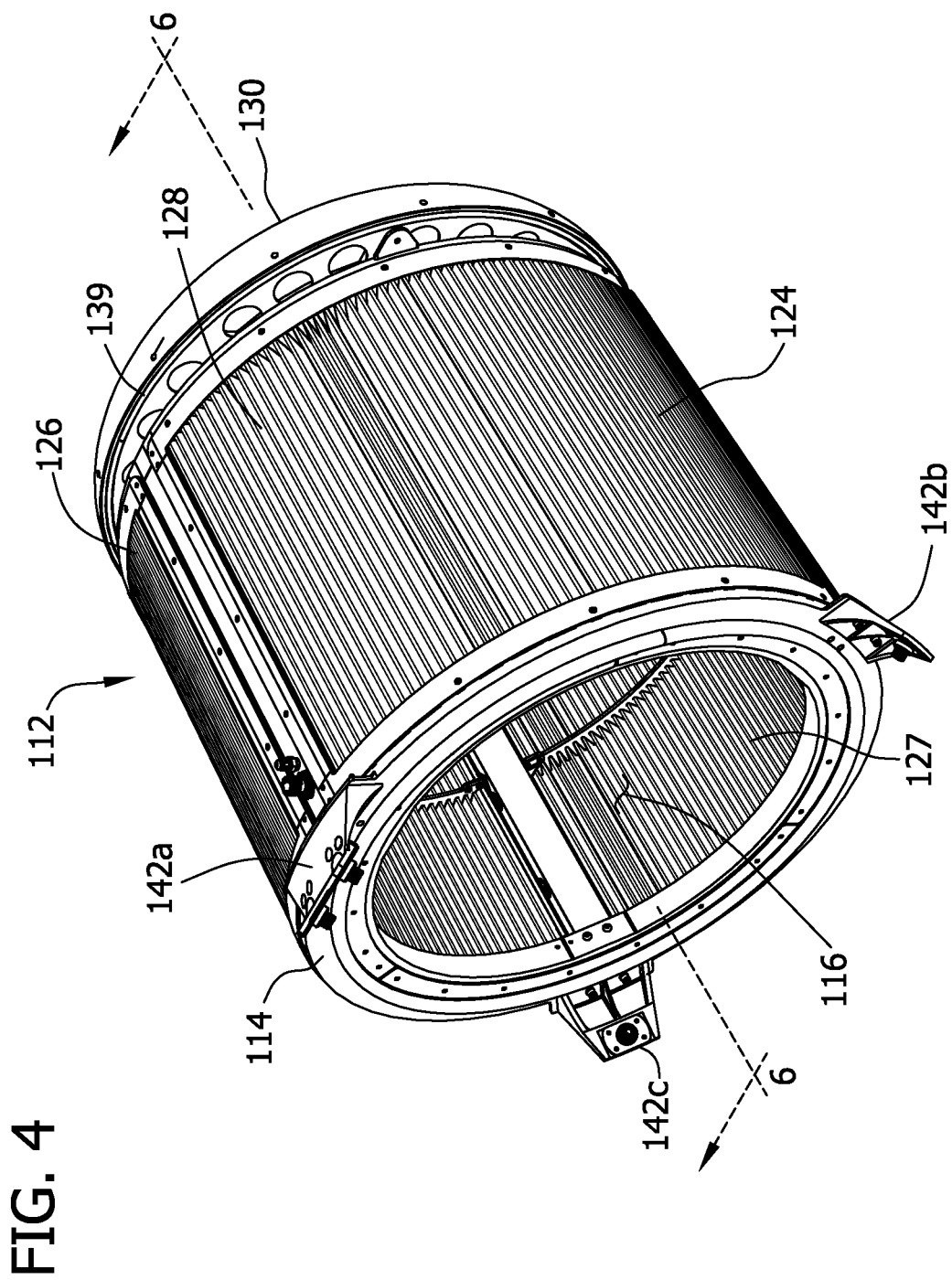
FIG. 4 is a rear perspective view of the filter system of FIG. 3.

Filter system 112 includes a filter assembly 114, which defines a substantially annular cross-section. More particularly, in this example embodiment, the filter assembly 114 includes a cylindrical filter assembly, as shown in FIG. 4. It is contemplated that filter assembly 114 may be substantially cylindrical, such that the filter assembly 114 defines a cylinder or defines a shape substantially consistent with a cylinder.

As shown in FIG. 4, the filter assembly 114 has an interior 116. The filter assembly 114 includes a first end 118 and a second end 120. The first end 118 defines a bypass opening 122 (shown in FIGS. 1 and 6-7), and the second end 120 is configured to couple to the air intake 110 of the aircraft engine 106 to permit intake air from the interior 116 to enter the air intake 110. More specifically, the second end 120 of the filter assembly 114 is mounted to the aircraft engine 106, with the intake 110 at least partially received within the second end 120, so that intake air within the interior 116 flows into intake 110 during operation.

The filter assembly 114 includes a filter media 124 disposed at least partially about a circumference of the filter assembly 114 for removing contaminants from intake air entering the interior 116 through the filter media 124. As should be apparent, a variety of configuration (e.g., size, shape, number of elements, orientation, etc.) of filter media 124 may be included in filter system embodiments. In this particular embodiment, filter media 124 includes filter elements 126, 127, and 128. Each filter element 126, 127, 128 defines a particle removal efficiency, for example, of at least about 97%, for 5-80 micron particles. As such, the filter elements 126, 127, 128 are configured to remove particle containments from the intake air, including sand and/or dust, which may be prevalent in various operating environments for helicopter 100.

Figure 5A:
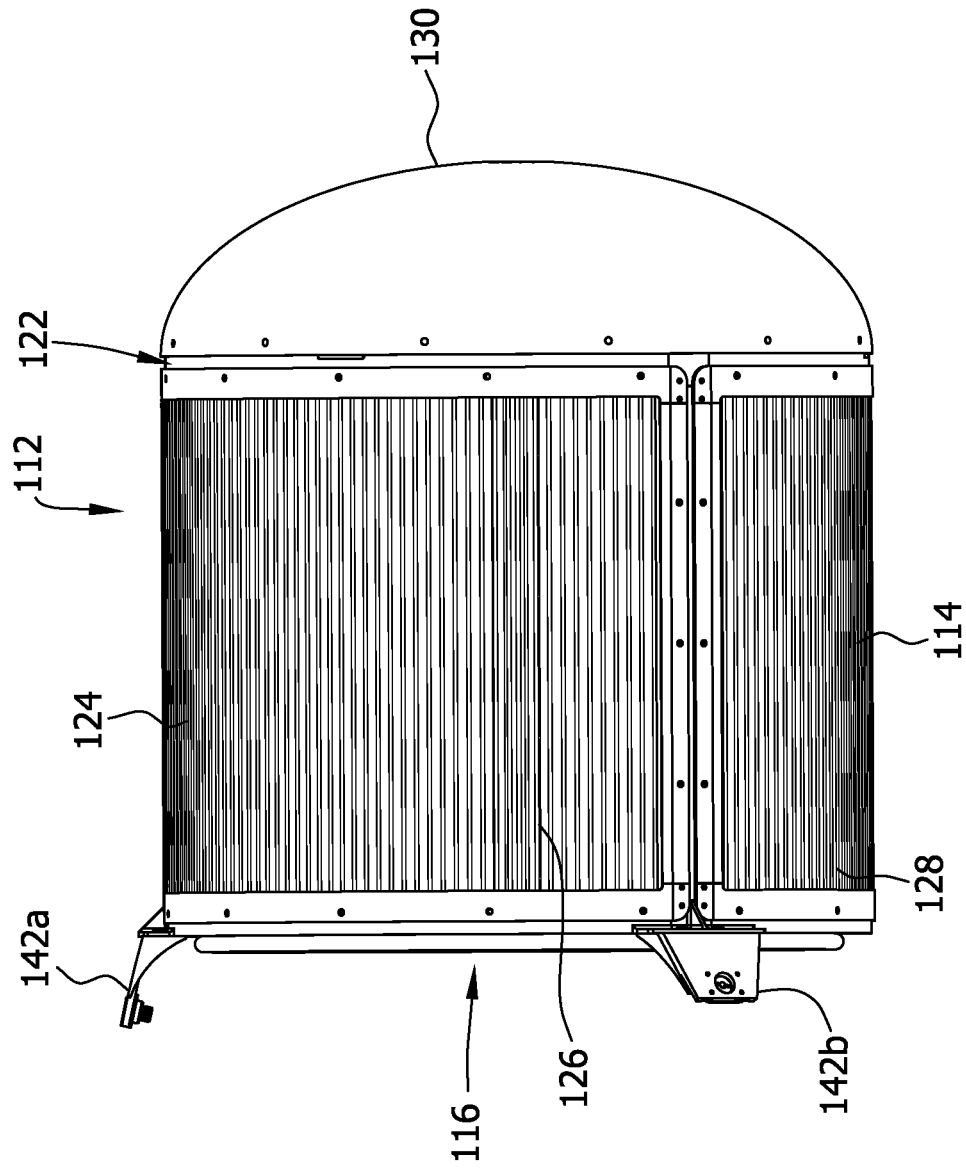
FIG. 5A is a elevational view of the filter system of FIG. 3, with a bypass closure in a closed position.
Figure 5B:
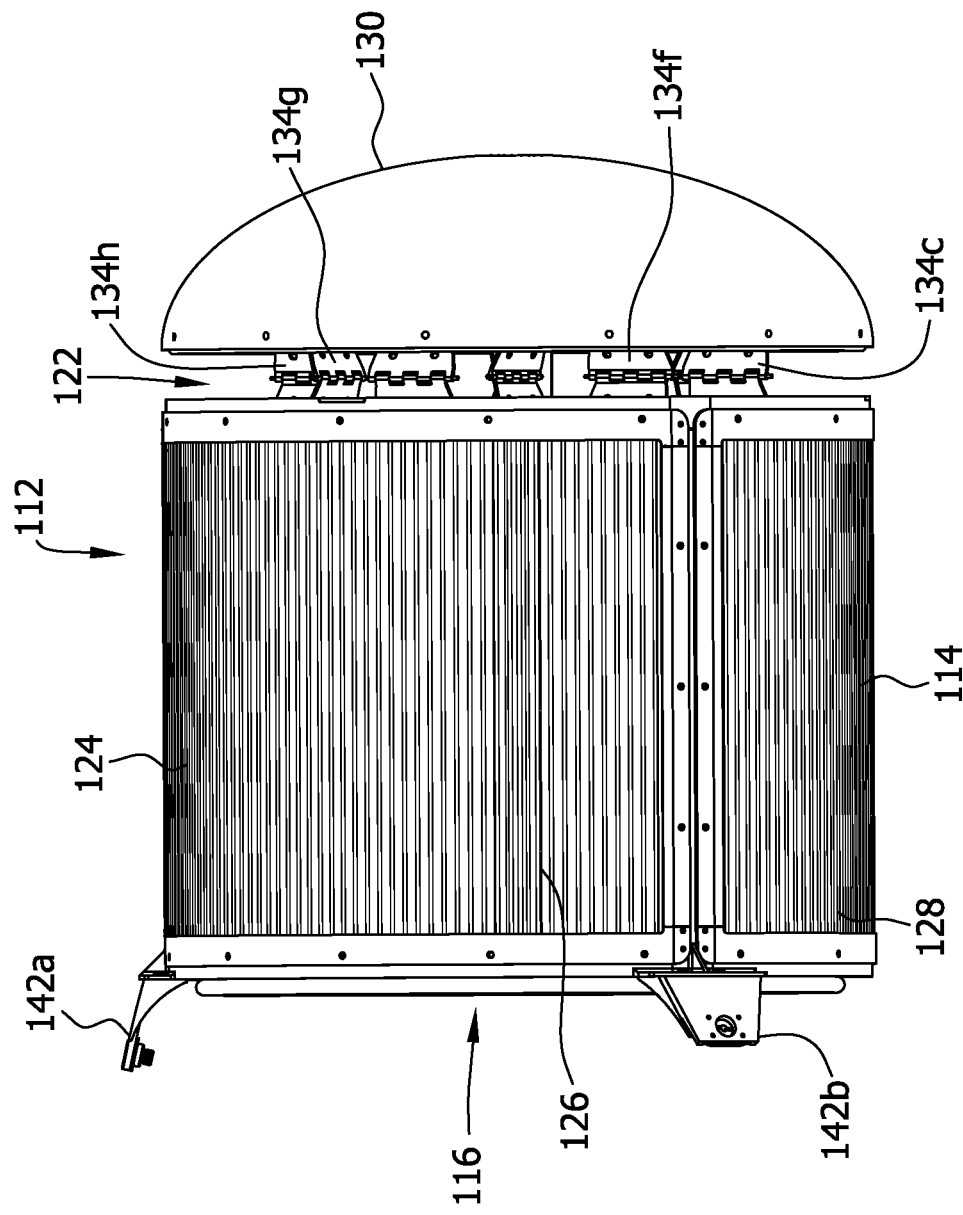
FIG. 5B is an elevational view of the filter system of FIG. 3, with a bypass closure in an opened position.

In the exemplary embodiment, the filter system 112 includes a bypass closure 130, which is disposed adjacent to filter assembly 114. The bypass closure 130 is movable relative to the filter assembly 114 between a first position and a second position. Specifically, in the first position, the bypass closure 130 substantially covers and substantially seals the bypass opening 122 of the filter assembly 114. Conversely, in the second position, the bypass closure 130 is spaced apart from the filter assembly 114, as shown in FIG. 5B. In this embodiment, the closure 130 moves axially along a central axis of the filter assembly and a central axis of the closure.

As shown, the bypass closure 130 is a substantially dome-shaped closure. In this manner, when the helicopter 100 is in flight, the bypass closure 130 provides reduced air resistance as compared to one or more other shaped bypass closures. It should be appreciated, however, that a bypass closure may define any suitable shape, size, and/or orientation for substantially covering the bypass opening 122 of the filter assembly 114, regardless of its air resistance during flight.

Figure 6:
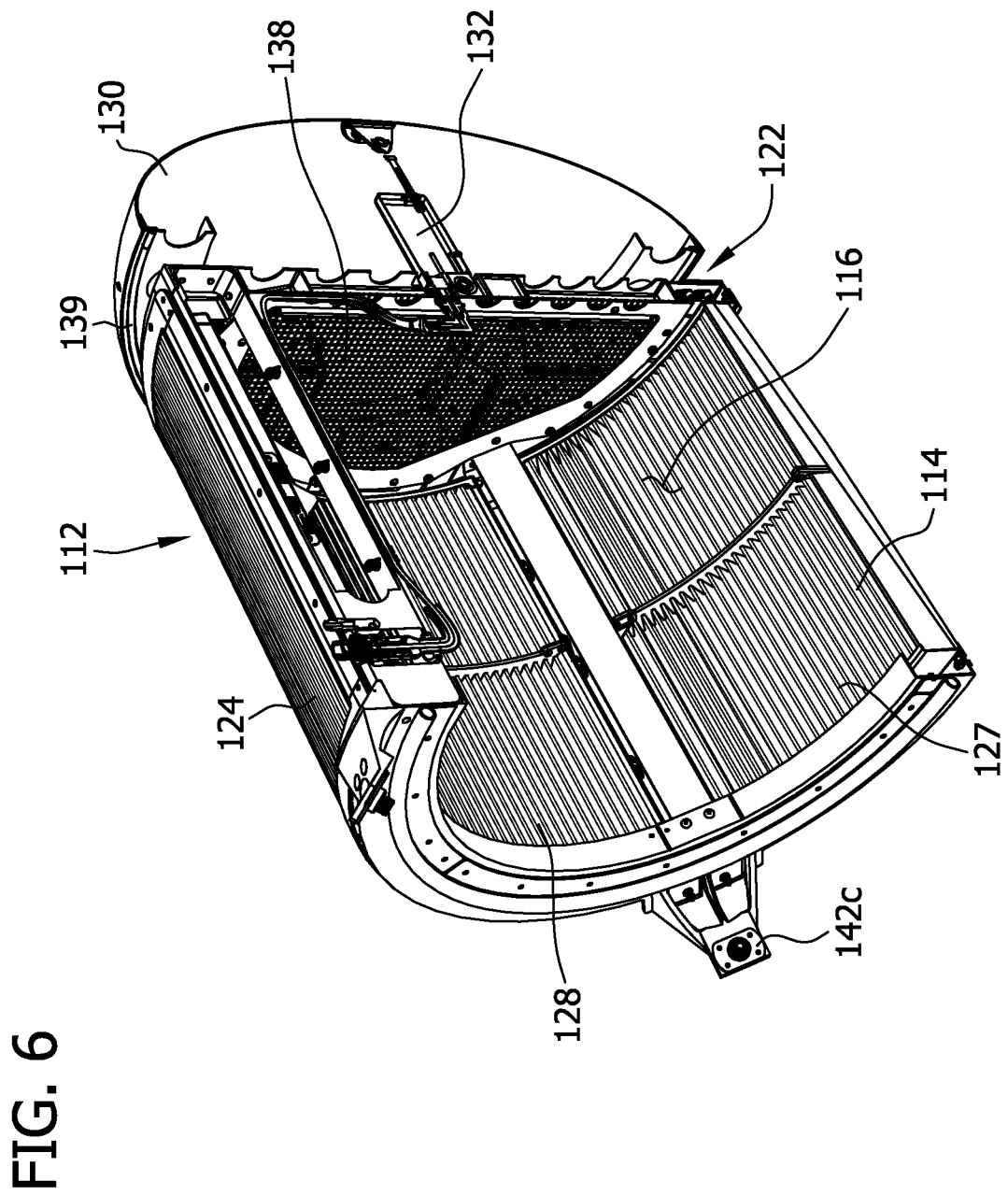
FIG. 6 is a perspective view of a cross-section of filter assembly of FIG. 4, along line 6-6.

The filter system 112 further includes an actuator 132 (as shown in FIG. 6) coupled between the bypass closure 130 and the filter assembly 114 to cause relative movement of the bypass closure between the first and second positions. In this embodiment, the actuator 132 is mounted to the filter assembly 114 and connected to the bypass closure 130 to move the bypass closure 130. In other embodiments, the actuator may be mounted to the bypass closure 130 and coupled to the filter assembly 114 to move the filter assembly 114. The actuator 132 may include an electrical actuator, a fluid actuator, a pneumatic actuator or other suitable device for causing relative movement between the filter assembly 114 and the bypass closure 130. It should be appreciated that a different number of actuators disposed at one or more different locations may be included in other filter assembly embodiments. Further, in this exemplary embodiment, the actuator is disposed at a center defined by an annular cross-section of filter assembly 114, in order to apply a balanced force to the bypass closure 130. Note that the cross-section may also simply be a closed cross-section, rather than a circular or annular cross-section. The actuator 132, however, may be otherwise positioned in other embodiments.

The relative, axial movement of the bypass closure 130 and the filter assembly 114 is provided by a suitable mechanism such as a plurality of hinges 134 coupled between the bypass closure 130 and the filter assembly 114. The plurality of hinges 134 include eight hinges 134a-h coupled between the bypass member and the filter assembly. As best shown in FIG. 7, the eight hinges 134a-h include four pairs of hinges evenly distributed about a circumference or the bypass closure 130. The even distribution of the hinges 134 permits balanced movement between the bypass closure 130 and the filter assembly 114. In some embodiments, however, the hinges 134 may be distributed otherwise at one or more different locations. While the hinges 134 are illustrated as separate and independent, it should be understood that two or more of the hinges 134 may be coupled to one another to provide rigidity to relative movement between the bypass closure 130 and the filter assembly 114. Further still, it should be appreciated that a different number of hinges 134 (including one hinge) may be included in other embodiments. Also, a stabilizer, such as stabilizer bars, may be added to provide additional rigidity to the hinges. In at least one embodiment, hinges 134 may be omitted from the filter system 112. In such an embodiment, multiple actuators may cause and/or provide relative movement between the bypass closure 130 and the filter assembly 114.

In use, intake air entered the interior 116 of filter assembly 114, in order to enter intake 110. The intake air may enter the interior 116 through filter media 124 and/or bypass opening 122, depending on the position of the bypass closure 130. More specifically, when the bypass closure 130 is disposed in the first position, i.e., a closed position, intake air enters the interior 116 of the filter assembly 114 through filter media 124. In this manner, intake air is filtered for contaminants, prior to entering the intake 110 of aircraft engine 106.

Due to one or more reasons, the filter media 124 may become restricted (e.g., due to a build up of dust, sand or ice, etc.) during operation of helicopter 100, such that intake air pressure entering through the filter media 124 is reduced. The intake air pressure reduction may be detected by one or more sensors disposed proximate to filter media 124. In response to the reduction of intake air pressure and/or an operator command, the actuator 132 is operated to move the bypass closure 130 from the first position to the second position, in which the bypass closure 130 is spaced apart from the filter assembly 114, as shown in FIG. 6. As a result, intake air is permitted to enter the interior 116 of the filter assembly 114 through the bypass opening 122. Because the bypass opening 122 bypasses the filter media 124 additional intake air is permitted to flow into the interior 116, and ultimately, into intake 110 of aircraft engine 106. In this manner, the filter media 124 reduces the amount of contaminants entering the intake 110, thereby protecting the aircraft engine 106 from damage, and also provides the bypass closure 130 to bypass the filter media 124 when determined by reduced intake air and/or an operator.

As shown in FIG. 7, the aircraft 100 includes a controller 136 to control one or more functions of aircraft 100. The controller 136 may include, for example, a full authority digital engine control (FADEC). In this exemplary embodiment, the actuator 132 is coupled to and responsive to the controller 136. More specifically, in one example, the aircraft 100 includes an input (not shown) for an operator of the aircraft 100 to command the bypass closure 130, via controller 136, to move between the first and the second positions. The input may include, without limitation, a button, a switch, a dial, and/or a knob, etc., disposed within a cockpit of aircraft 100 that is accessible to an operator of aircraft 100. When the operator input is toggled, the controller 136 commands the actuator 132 to cause relative, axial movement of the bypass closure 130 to the first or second position as requested by the operator of aircraft 100.

Additionally, or alternatively, controller 136 may be responsive to one or more sensors (not shown) situated proximate to filter media 124. In at least one embodiment, the sensors are situated to detect air pressure within the interior 116 to determine if sufficient intake air is entering through filter media 124. If insufficient intake air is entering through filter media 124 (indicative that the filter media 124 is restricted and/or iced over), the controller 136 may automatically command the actuator 132 to move the bypass closure 130 to the second position, thereby permitting intake air to enter through bypass opening 122. Alternatively, the controller 136 may provide an indication of the reduced intake air pressure to the operator of the aircraft 100, and await an operator command as described above. The bypass closure 130 may be actuated between the first and second positions for various reasons, related to, without limitation, safety and performance.

In the exemplary embodiment, the filter system 112 includes a foreign object debris (FOD) screen 138 positioned to filter intake air entering the interior through the bypass opening. As shown in FIGS. 1 and 6-7, the FOD screen 138 is disposed at least partially within the bypass opening 122. More specifically, the FOD screen 138 is disposed to filter intake air entering through the bypass opening 122, but not filter and/or other inhibit flow of intake air entering interior 116 through the filter media 124. In contrast with the filter media 124, the FOD screen 138 is significantly more porous than the filter media. For example, FOD screen 138 defines a ¼" by ¼" stainless steel mesh in this exemplary embodiment. It should be appreciated, however, that the FOD screen 138 may include a different configuration (e.g., shape, size, mesh, etc.) and/or be positioned elsewhere in other filter assembly embodiments. In at least one embodiment, the FOD screen 138 may be omitted.

The filter system 112 includes an elastomeric seal 139 coupled to the bypass closure 130. The elastomeric seal 139 is configured, such that when the bypass closure 130 is disposed in the first position, a seal forms between the bypass closure 130 and the filter assembly 114 to inhibit intake air from entering the interior 116 of the filter assembly 114 through the bypass opening 122. It should be appreciated that the seal may be disposed elsewhere and/or be made from a variety of materials, possibly depending on one or more environments, in which aircraft 100 is intended to operate. In one example, the elastomeric seal 139 may be coupled to the filter assembly 114 and disposed to contact the bypass closure 130, when disposed in the first position.

Referring again to FIG. 3, the filter system 112 includes three mounting brackets 142a-c. Each of the mounting brackets 142 is structured to be mounted to the air intake 110 of the aircraft engine 106 to support filter system 112 relative to the aircraft engine 106. In this particular embodiment, brackets 142 are configured to permit the air intake 110 to be at least partially received in the second end 120 of the filter assembly 114. It should be apparent that a different number and/or configuration (e.g., size, shape, position, etc.) of brackets 142 may be employed in other embodiments to mount the filter system 112 to the aircraft engine 106, potentially depending on the aircraft 100 in which the filter system 112 is included. In at least one embodiment, the brackets 142 may include multiple mounting apertures, such that filter system 112 is universal to multiple types of aircrafts 100.

FIG. 8 illustrates a method 200 of retrofitting a filter system according to another exemplary embodiment. While the method 200 is described with reference to the aircraft 100 and filter system 112, it should be appreciated that the method 200 may be employed to retrofit a variety of different aircrafts and/or filter systems, and is therefore not limited to the aircraft 100 and/or filter system 112 illustrated in FIGS. 1-7. Likewise, the aircraft 100 and filter system 112 described above are not limited to the method described with reference to FIG. 8.

In the exemplary embodiment, method 200 includes removing 202 a filter system associated with an air intake 110 of an aircraft engine 106 and coupling 204 a replacement filter system 112 to the air intake 110 of the aircraft engine 106. The replacement filter system 112 includes the bypass closure 130 and the substantially cylindrical filter assembly 114 having the interior 116 and a first end 118 defining a bypass opening 122. As described above, the bypass closure 130 is movable between a first position and a second position.

In some embodiments, method 200 may include coupling the actuator 132 to a controller 136, the controller configured to provide a bypass command to the actuator to control movement of the bypass closure between the first and second positions in response to at least one of an operator input and an intake air condition.

When introducing elements of the present invention or the embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above constructions without departing from the scope of the invention, it is intended that all matter contained in the above description and shown in the accompanying drawings shall be interpreted as illustrative and not in a limiting sense.

What is claimed is:

1. A filter system for an air intake of an aircraft engine, said filter system comprising:
a filter assembly having an interior, a first end defining a bypass opening, and a second end for coupling to an air intake of an aircraft engine to permit intake air from the interior to enter the air intake, the filter assembly defining a substantially annular cross-section and including at least one filter media for removing contaminants from intake air entering the interior through the filter media;
a bypass closure movable relative to the filter assembly between at least a first position and a second position, the bypass closure substantially covering the bypass opening in the first position to inhibit intake air from entering the interior through the bypass opening, the bypass closure spaced apart from the filter assembly in the second position to permit intake air to enter the interior through the bypass opening; and
an actuator coupled to at least one of the filter assembly and the bypass member to cause relative movement of the bypass closure between the first and second positions.

2. The filter system of claim 1, wherein the bypass closure includes a substantially dome-shaped bypass closure.

3. The filter system of claim 1, wherein the bypass closure is movable axially relative to the filter assembly.

4. The filter system of claim 1, further comprising a plurality of hinges coupled between the filter assembly and the bypass closure to permit axial movement between the filter assembly and the bypass closure.

5. The filter system of claim 1, further comprising a foreign object debris (FOD) screen positioned to filter intake air entering the interior of the filter assembly through the bypass opening.

6. The filter system of claim 1, wherein one of the bypass closure and the filter assembly includes an elastomeric seal to contact the other of the bypass closure and the filter assembly to inhibit intake air from entering the interior of the filter assembly through the bypass opening when the bypass closure is disposed in the first position.

7. The filter system of claim 1, wherein the actuator is mounted to the filter assembly substantially at a center defined by the annular cross-section of the filter assembly.

8. An aircraft comprising:
a fuselage having a forward direction;
an aircraft engine coupled to the fuselage, the aircraft engine including at least one intake generally facing the forward direction for receiving intake air; and
a filter system including a bypass closure and a filter assembly having an interior, a first end defining a bypass opening, and a second end coupled to the intake for permitting intake air flow from the interior of the filter assembly into the intake of the aircraft engine, the filter assembly defining a substantially annular cross-section;
wherein the bypass closure is movable between a first position and a second position, the bypass closure substantially covering the bypass opening in the first position to inhibit intake air from entering the interior through the bypass opening, the bypass closure spaced apart from the filter assembly in the second position to permit intake air to enter the interior through the bypass opening.

9. The aircraft of claim 7, wherein the aircraft is a helicopter.

10. The filter system of claim 8, wherein the bypass closure is movable axially relative to the filter assembly.

11. The aircraft of claim 9, further comprising an actuator coupled to the bypass member and the filter assembly, the actuator operable to move the bypass member between the first and second positions in response to a bypass command.

12. The aircraft of claim 10, wherein the bypass command is based on at least one of a pressure differential between the interior and an exterior of the filter assembly and an operator input.

13. The aircraft of claim 10, wherein the filter assembly includes a foreign object debris (FOD) screen positioned within the interior of the filter assembly to filter at least intake air received through the bypass opening.

14. The aircraft of claim 10, wherein the filter system includes a plurality of hinges coupled between the filter assembly and the bypass closure to permit axial movement between the filter assembly and the bypass closure.

15. The aircraft of claim 14, wherein the plurality of hinges includes four pairs of hinges substantially evenly distributed about a circumference of the filter assembly.

16. The aircraft of claim 10, wherein the bypass closure includes a substantially dome-shaped bypass closure.

17. The aircraft of claim 16, wherein the filter assembly includes a filter media disposed at least partially about a circumference of the substantially cylindrical filter assembly for removing contaminants from intake air entering the interior through the filter media, the filter media including at least two filter media segments.

18. A method of retrofitting a filter system for an air intake of an aircraft engine, said method comprising:
removing a filter system associated with an air intake of an aircraft engine; and
coupling a replacement filter system to the air intake of the aircraft engine, the replacement filter system including a bypass closure and a substantially cylindrical filter assembly having an interior and a first end defining a bypass opening, the bypass closure movable between a first position and a second position, the bypass closure substantially covering the bypass opening in the first position to inhibit intake air from entering the interior through the bypass opening, the bypass closure spaced apart from the filter assembly in the second position to permit intake air to enter the interior through the bypass opening.

19. The method of claim 18, wherein the replacement filter system includes an actuator operable to move the bypass closure between the first and second positions; and
further comprising coupling the actuator to a controller, the controller configured to provide a bypass command to the actuator to control movement of the bypass closure between the first and second positions in response to at least one of an operator input and an intake air condition.

* * * * *